May 23, 1950

V. E. PRATT ET AL
METHOD AND MEANS OF PHOTOGRAPHY
EMPLOYING A SCANNING CAMERA 2,508,650

Filed Nov. 14, 1945

INVENTORS
VERNEUR E. PRATT
GEORGE F. GRAY
BY
*Van Deventer Grier*
ATTORNEYS

May 23, 1950

V. E. PRATT ET AL
METHOD AND MEANS OF PHOTOGRAPHY
EMPLOYING A SCANNING CAMERA 2,508,650

Filed Nov. 14, 1945

INVENTORS
VERNEUR E. PRATT
GEORGE F. GRAY
BY
Van Deventer & Grier
ATTORNEYS

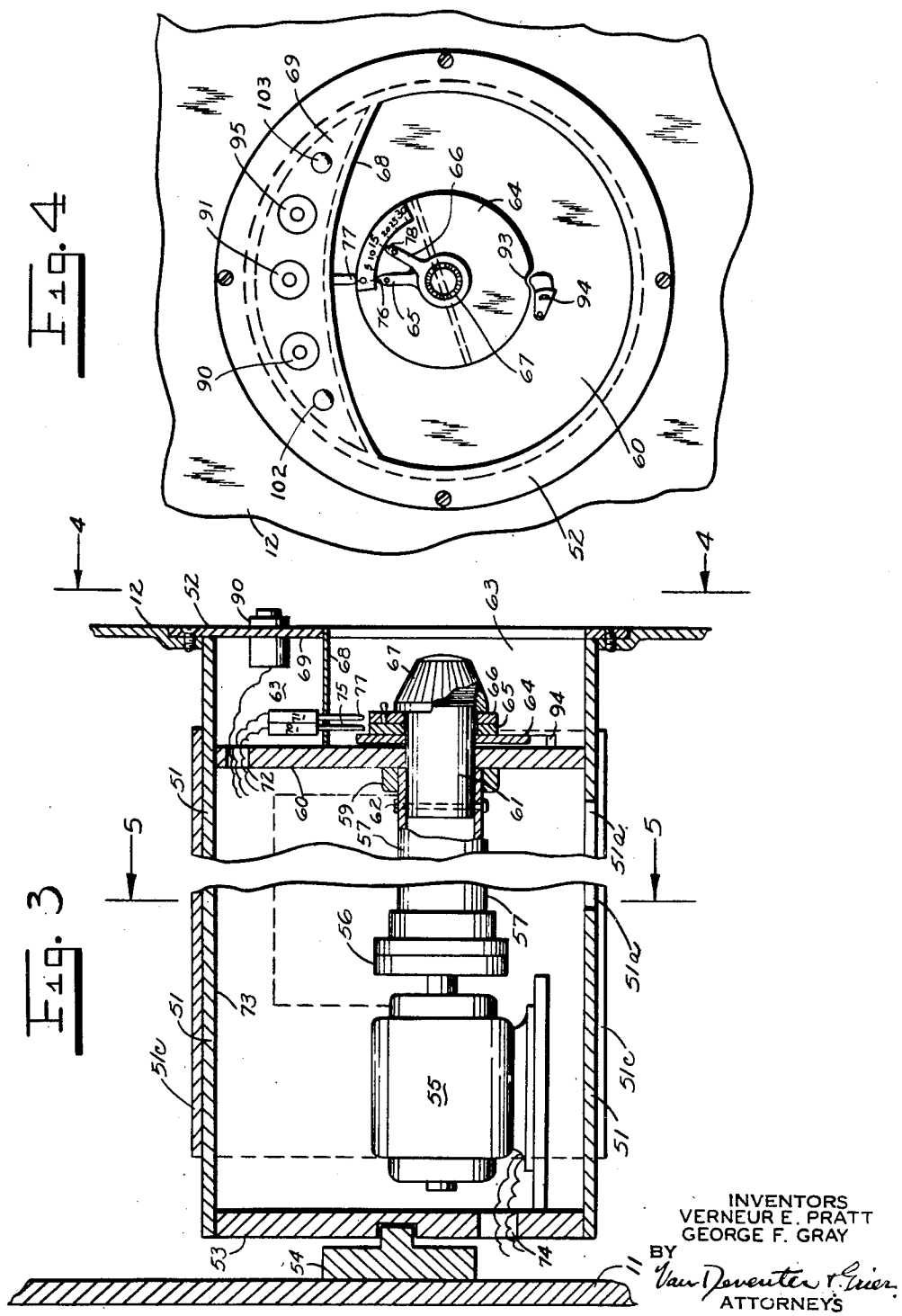

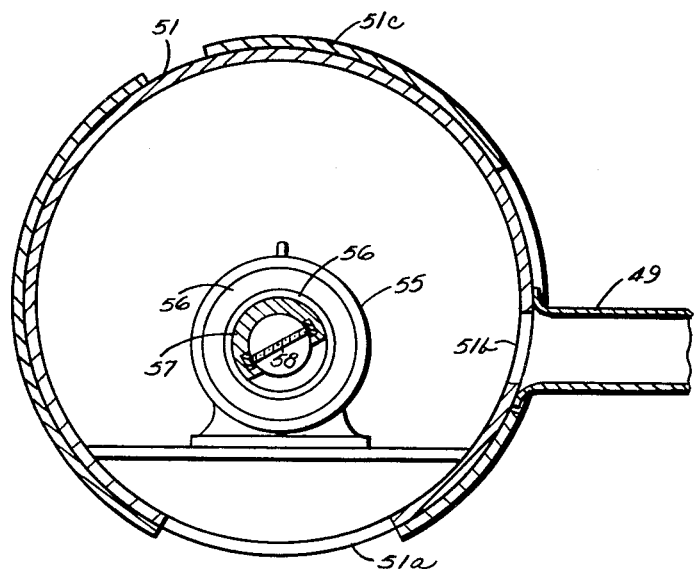
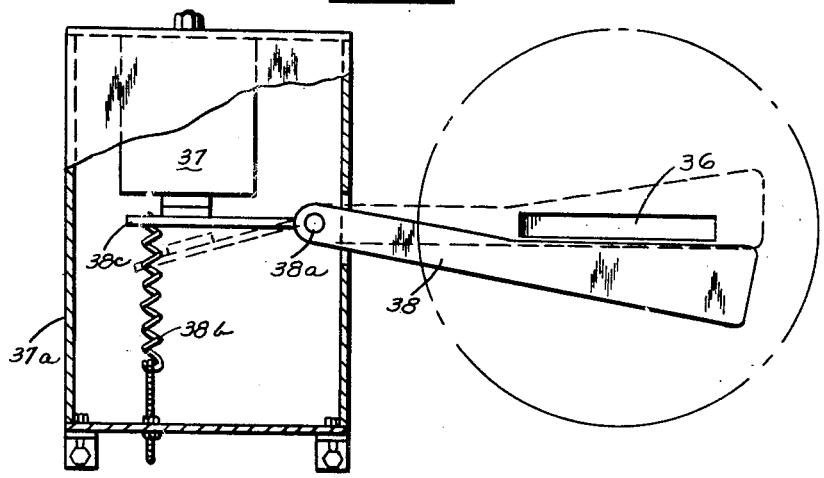

May 23, 1950 V. E. PRATT ET AL 2,508,650
METHOD AND MEANS OF PHOTOGRAPHY
EMPLOYING A SCANNING CAMERA
Filed Nov. 14, 1945 5 Sheets-Sheet 5
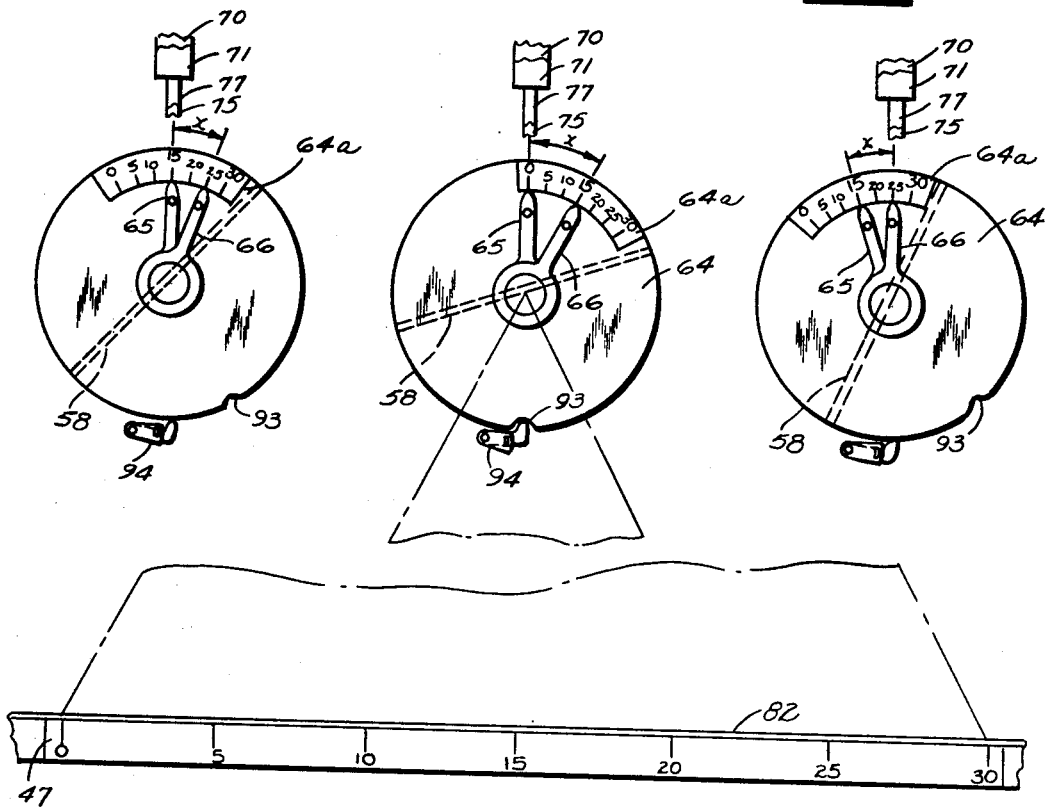
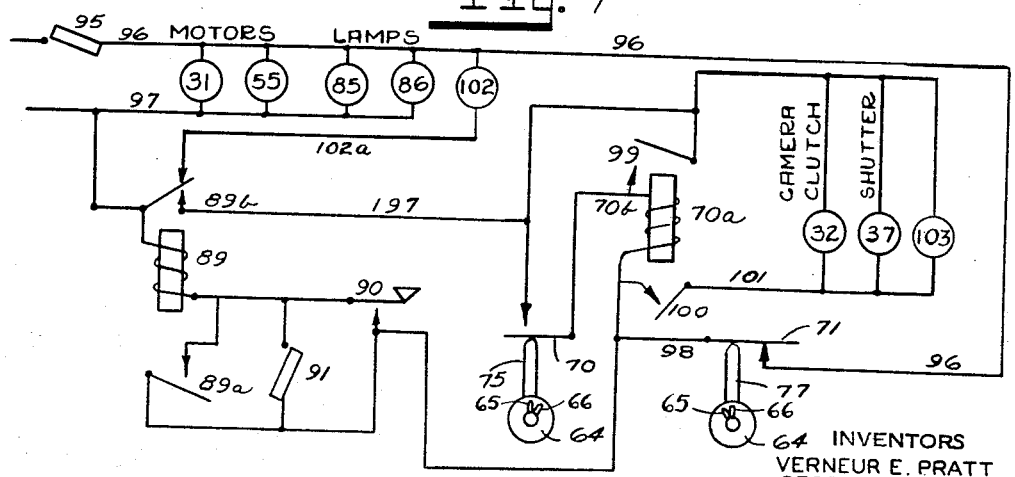
INVENTORS
VERNEUR E. PRATT
GEORGE F. GRAY
BY
*Van Deventer & Grier*
ATTORNEYS Patented May 23, 1950

2,508,650

UNITED STATES PATENT OFFICE 2,508,650

METHOD AND MEANS OF PHOTOGRAPHY EMPLOYING A SCANNING CAMERA

Verneur E. Pratt and George F. Gray,
Norwalk, Conn.

Application November 14, 1945, Serial No. 628,540

21 Claims. (Cl. 88—24)

This invention relates to a method of photography employing a scanning camera and apparatus for carrying out this method. The term scanning camera is selected by us to denote a camera in which the object to be photographed is stationary, said camera including means for scanning the stationary object and impressing the flowing or moving image of the object upon a moving photo-sensitive medium such, for example, as a film. The scanning means and the film are moved in definite time relation to one another, while the object remains at rest.

In ordinary flow cameras of the prior art, the copy and a film are moved relative to each other to produce a continuous image on the film. A slit, or mask, is stationary. The copy flowing past the slit is photographed on a film moved at some desired speed corresponding to the speed of the copy. While such cameras can be used for flat copy, such as checks, papers, drawings, etc., they cannot satisfactorily be used with books, which cannot be flowed by belt or drum feeders and the like and the pages turned to be photographed while the book is moving.

Heretofore, books or copy bound in binders or the like have been photographed page-by-page by still cameras which photographed at each exposure, one-half of, or the entire open book, the film being moved intermittently between each exposure. The field of view of such cameras is necessarily limited due to the fact that the field of the lens is always a circle, and therefore in photographing square or rectangular objects the resolution in the corners is poor. Of course expensive lenses are employed in such still cameras in order to attempt to overcome this defect. Even with the more expensive and highly corrected lenses the resolution in the corners is not perfect.

Contrasted with this, the flow type cameras employ slits which span a band across the center of the lens, and therefore throughout the area of this slit the resolution is good even though the less expensive lenses are employed. Now having a slit defining an area of good resolution in the lens, photographs of good resolution may be made by flowing or moving the object past the slit.

Since books or tomes are heavy and otherwise unwieldy we, according to the present invention, maintain the book stationary and impress a flowing image of the same upon the moving film in the camera thereby obtaining the flow camera effect with the object stationary.

The principal object of the invention is the provision of a method of photographing in which the object is stationary and in which a moving element, moving in timed relation to the movement of a moving film in a camera, is provided for sweeping over or scanning the stationay object and impressing a flowing image of the same upon said flowing film.

Another object of the invention is the provision of control means for the scanning element which enables the operator to selectively define the bounds of the image impressed upon the moving film. In other words, assuming that a book is to be photographed, the operator may set the controls so that the entire areas of the two pages of the book may be photographed, or they may be set to limit the photographing to any desired portion of either of the uppermost and exposed pages of the book. To say this in still other words, the operator may select the entire field to be scanned or any desired portion thereof.

Other objects and advantages will be apparent from the following specification where, by way of illustration, one embodiment of the invention is disclosed. It will be understood, however, that the invention is only limited by the scope of the appended claims.

In the accompanying drawings:

Figure 3 is a longitudinal view partly in section of the revolving mirror and unit of Figure 1;

Figure 4 is a front view of the dials and controls of Figure 3;

Figure 5 is a sectional view on the line 5, 5 of Figure 3;

Figure 6 is a detail view of a shutter mechanism for use with the camera shown in the preceding figures;

Figure 7 is a diagram of the electrical circuits of the device shown in the preceding figures;

Figure 8 shows diagrams of the camera control shown in the preceding figures;

Figures 9 and 10 are diagrams of the control Figure 8 at the beginning and end of a scanning operation; and Figure 11 is a view similar to Figure 2 and showing a concave copy support.

Figure 1:
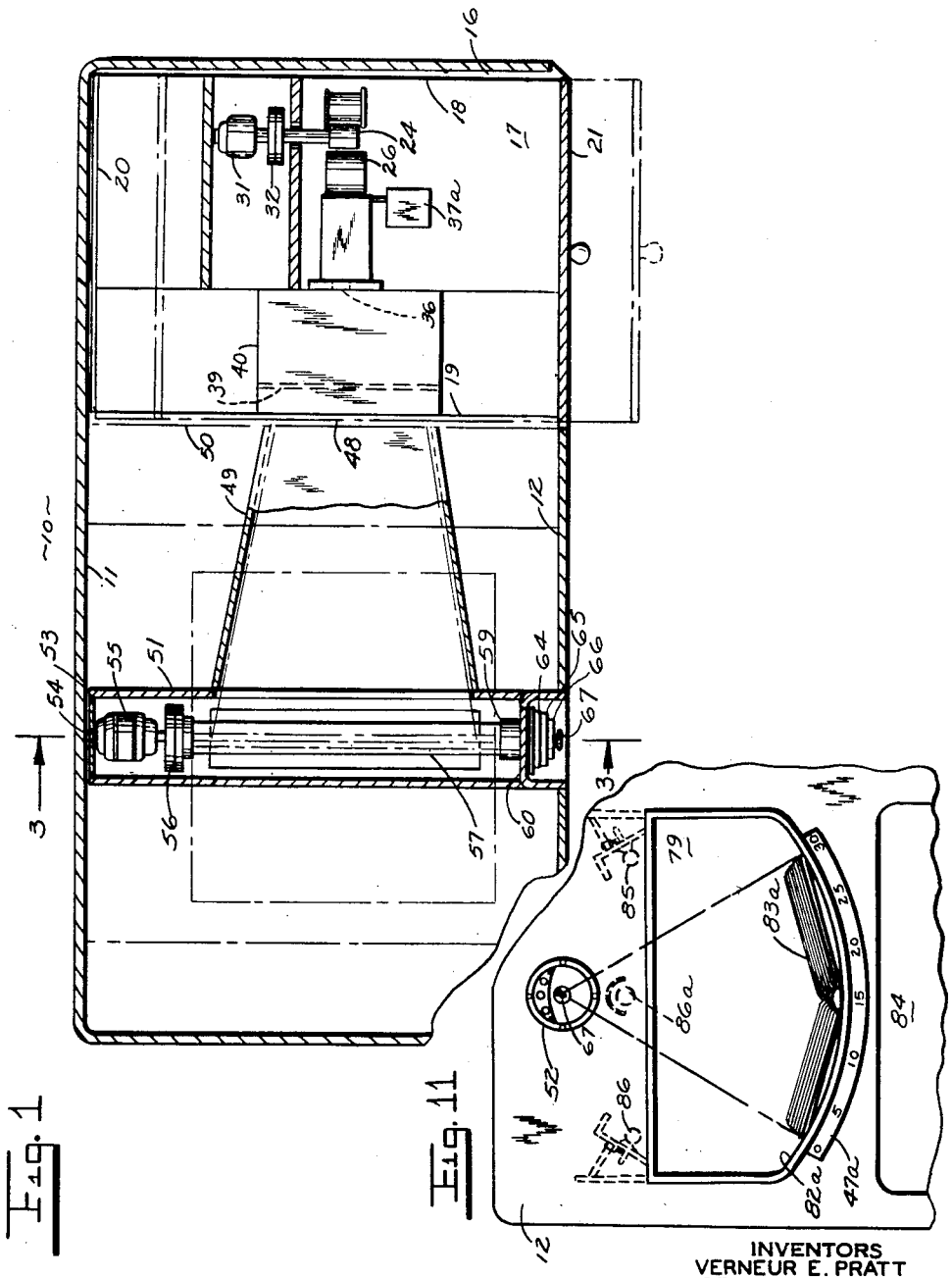
Figure 1 is a horizontal sectional view of a scanning camera with which this new method of photography can be practiced and embodying the invention.

Referring to Figure 1 the numeral 10 denotes a casing or cabinet similar to a steel filing cabinet and 52" high and approximately 28" deep, which enables the cabinet to be associated with ordinary file cabinets.

The cabinet is constructed in any suitable manner to form a supporting framework and has a rear wall 11, a front wall 12 and any desired number of drawers or compartments, such as the drawers 13 and 14.

Compartments 15 and 16 are provided above the drawers to contain a drawer 17 having side walls 18, 19 and a rear wall 20 to contain certain parts hereinafter described. Compartments 15 and 16 have a door 21 forming the front of drawer 17 and slidable in and out of the cabinet at 22 to expose the apparatus in drawer 17 and permit access thereto.

The apparatus in drawer 17 comprises a flow camera of the type described in the co-pending application Serial Number 507,939, filed on October 28, 1943, now Patent #2,435,099, dated January 27, 1948, and entitled: "Photographic devices and method of operating same," and is not described here in detail. Briefly, the camera includes a delivery reel 23, a driving roller 24, a take-up reel 25, a drum 26, a roller 28 and guide rollers 27 and 29.

A light sensitive medium, such as photographic film 30, is wound off reel 23 and around the roller 28, the drum 26, and the roller 24, to reel 25 by a synchronous motor 31 connected to a suitable clutch 32 connected to shaft 33 of the driving roller 24. The motor or the clutch may contain suitable speed reducing mechanism such as gearing or the like, and such speed reducers are well known. Belt drives can be used if desired. A lens 34 is positioned in front of the drum 26, and a member defining a slit 35 is positioned between the lens and the drum. The film 30 is at the back focus of the lens.

A second member defining a slit 36 may, if desired, be placed in front of the lens to define the area of the beam of light entering same.

A shutter mechanism as shown in Figure 6 comprises the magnet 37 mounted in a casing 37a. A shutter 38 is pivoted upon the casing at 38a and is adapted to, and urged by, spring 38b to normally close the slit 36 and to uncover same when the film 30 is in motion and magnet 37 energized, as hereinafter described.

A casing 39 is secured to the light tunnel 40, and has an extension 41 which can be moved on 39 by means of a rack and pinion 42, the pinion can be revolved by means of a shaft extending outwardly through the door 21 or in any other suitable manner. In casing 39 is secured mirrors 43, 44, and in the movable extension 41 is secured mirrors 45, 46, so that by adjusting the pinion 42 the length of the optical path between the copy and the lens can be varied as described more in detail in the copending application Serial Number 593,891, filed May 15, 1945, and entitled: "Optical system for microfilm apparatus," now Patent #2,439,055, dated April 6, 1948.

The side 19 of drawer 17 has an aperture 48 therein to form a portion of the light tunnel 40, and said tunnel is continued by the section 49 thereof, one end of which is supported on the partition 50 of the casing, and the other end on the casing 51 of the mirror unit.

The means for transmitting sectional images of a stationary object, such as 83, to the lens 34 now to be described, may be constructed in several ways as the movable optical beam deflecting member thereof which is the essential feature, can be oscillated to swing back and forth above the copy. Or it can be rotated as herein described. It will therefore be understood that the inventive concept herein described is the broad one of having a means between the copy and the lens to scan the copy while the lens remains stationary and the film is moved past the lens in timed relation to the movement of the scanning means. It may also be pointed out that any suitable optical means, can be used instead of the mirror, and that such means forms part of the light path between the support and copy thereon and the lens of the camera.

The various means necessary to move the mirror, other than the rotary means disclosed herein, form the subjects matter of applications for patents to be presently filed, and all such and any other means for moving a scanning member in a camera as herein described are deemed to be within the scope of the appended claims relating to this important feature of the invention.

The scanning unit casing 51 having a front plate 52 is supported by screws, or the like, on the front 12 of the cabinet. The casing extends rearwardly, and its rear end 53 is supported in any suitable manner such as the support 54 mounted on the rear wall 11 of the cabinet. The casing 51 contains a synchronous motor 55 supported therein in any suitable manner and having reduction gearing 56 (if necessary to reduce the speed) through which the motor is connected to a tubular frame or member 57 to be revolved thereby.

The member 57 has a suitable means 58 such as a mirror for directing a beam of light received through the aperture 51a from the copy 83, into the light tunnel 49 via aperture 51b to the lens 34 of the camera.

The forward end of member 57 is supported in a bearing 59 attached to or forming part of the partition wall 60 of the member, and a tubular shaft 61 is secured to the member 57 at 62 in any suitable manner and extends outwardly into the space 63 in front of the partition wall 60. On the outer end of the shaft 61 is mounted the disc 64 which is secured thereto and moves therewith.

Loosely mounted upon the shaft 61, so as to be freely revolvable thereabout, are the timing fingers 65, 66.

The outer end of shaft 61 is threaded to receive a knob 67 which, when screwed inwardly upon the shaft 61, will clamp fingers 65 and 66 in any selected position relative to the disc 64 and mirror 58.

A removable partition 68 extends between the partition 60 and the portion 69 of the front plate 52 and forms the lower closure for the space 63 in which is mounted the camera control switches 70, 71 the control switches 90, 91 and 95, and the signal lamps 102, 103. Conductors from the apparatus mounted in or upon casing 51 may extend through the opening 72 in the wall 60 and extend along the underside of the upper wall 73 of the casing and finally exit therefrom at 74 together with the conductors from motor 55.

The camera switch 70 has a downwardly extending member 75 adapted to contact the cam nose 76 on the timing finger 65, and camera switch 71 has a downwardly extending member 77 adapted to contact a cam nose 78 on timing finger 66.

The cabinet 10 has a rectangular opening 79 formed in the front wall thereof through which the copy may be positioned in the field of the camera. Side walls 80 and 81 extend inwardly from the opening 79 and are connected to the rear wall 11 of the cabinet. The copy support 82 extends from the lower edge of the opening 79 inwardly to the rear wall 11 of the cabinet and may be connected to the side walls 80 and 81.

Figure 2:
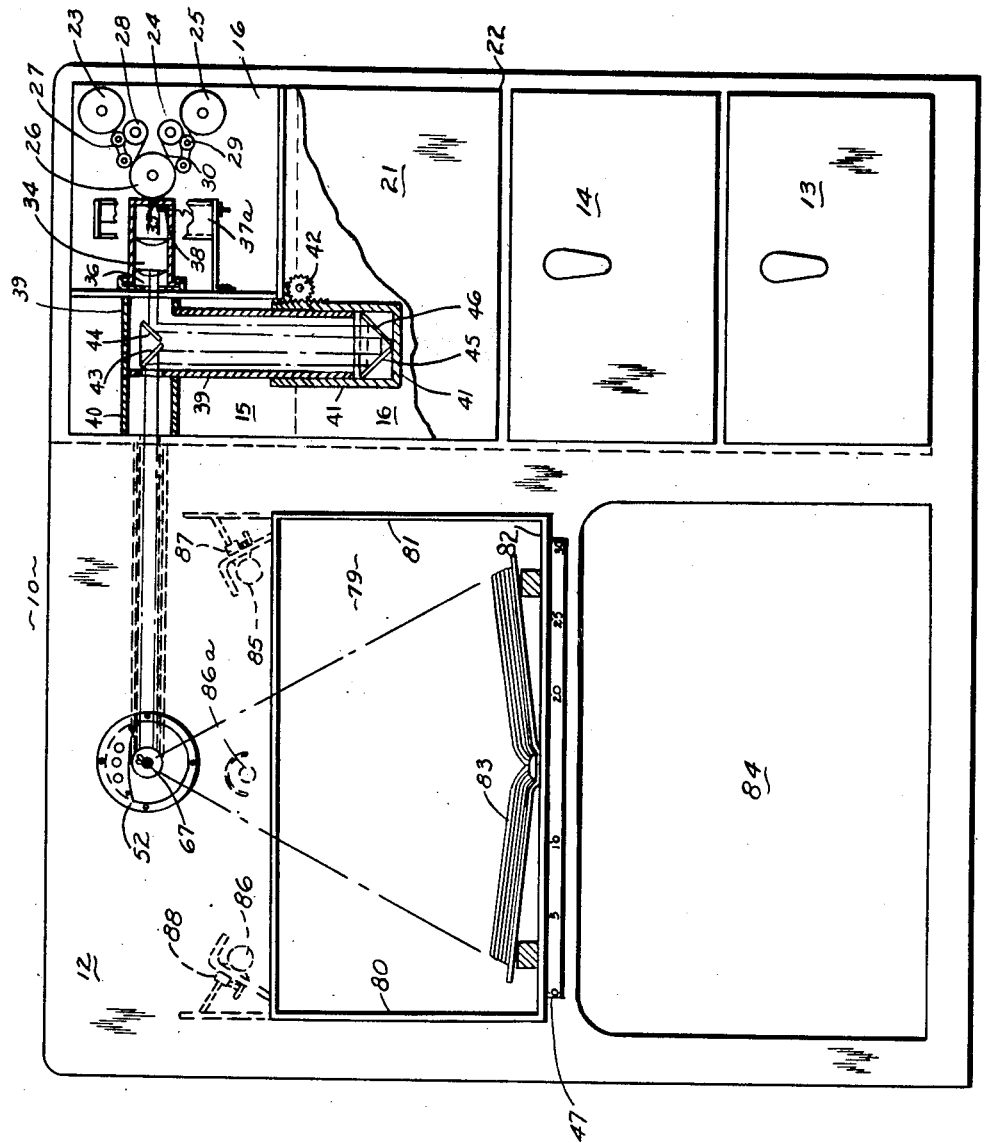
Figure 2 is a front view of the camera Figure 1 with the door to the camera compartment open.

In Figure 2 the copy support 82 is shown as flat and horizontal, and in the modified form, Figure 11, to be presently described, the copy support is curved. The copy, which for example may be a book or tome 83, is placed in the field of the camera through the opening 70, and as the photographing progresses the operator may freely turn the pages via this opening.

Due to the fact that applicants' improved scanning device flows a progressive slit image of the still object upon the film in the camera, the slit, as hereinbefore pointed out, utilizes a band of the center of the lens where the best resolution is obtained, and due to the fact that slit images are dealt with, the depth of field is sufficient to take care of books of the average thickness without having to refocus the lens. In case greater depth of field is required a "book cradle" as commonly used with still cameras may be used to support the book and insure the accurate location of the pages being photographed.

The copy support 82 is positioned within the sweep of mirror 58 as presently described, and is located at desk height from the floor—31" for the convenience of the operator.

The front 12 of the cabinet is cut away as shown at 84 to provide leg room for the operator, who is seated in front of the cabinet when operating the camera.

Positioned above the upper edge 84 of the copy space 79 or in or upon the walls 80, 81, are suitable lamps 85, 86, on any suitable form of bracket or mounting such as the brackets 87, 88, so that the lamps can be adjusted toward and away from the copy 83, and to uniformly illuminate same all over the area to be photographed. The complete apparatus assembled as above described is connected by circuits as shown in Figure 7, together with relays 89 and 70a, and switches 90 and 91, the latter being a switch that can be locked in closed circuit position, and is connected to the usual source of suitable current supply.

The width of the scanning beam 92 may be one inch and the mirror is adjusted at each set-up so that this beam lies slightly to the left of the copy on support 82. This is accomplished by providing a notch 93 in disc 64 and a catch 94 having an over-center toggle so the catch will be thrown clear of disc 64 as soon as the disc starts to revolve. This catch of any suitable construction is mounted on the wall 60 and is thrown into the notch so that in starting the mirror will always be in the same position and the assembly will be held against turning during the adjustment of the timing fingers.

Assuming the copy support 82 would support copy 30 inches wide, and it is desired to scan only one-half the copy, say the left-hand page of book 83 from 0 to 15 on the copy space scale 47, Figure 8, the catch 94 is set in notch 93 and the timing finger 65 is set at "0" on the timing scale 64a near the periphery of disc 64 as shown. The timing finger 66 is set at "15" on said scale and the knob 67 tightened on its shaft to hold the timing fingers in adjusted position. The camera being provided with film, when the main switch 95 is closed, current flows in conductors 96, 97 illuminating lamps 85, 86 and starting motors 31, 55. This also illuminates the small green signal light 102 indicating to the operator that the switch 90 may be closed if desired. This light is on only when relay 89 is not energized, as will be obvious from a study of the circuit diagram Figure 7.

Catch 94 is thrown out of the notch 93 and the mirror 58 is revolved by motor 55 in an anti-clockwise direction to scan via scanning beam 92 the entire copy space on 82. However, as the camera shutter 38 is closed and the film moving means in the camera is not in motion as clutch 32 is not energized, no photograph is made.

(1) To photograph, the operator depresses and closes push button switch 90, whereupon a circuit is completed via conductor 97 through winding of relay 89, through switch 90 (which is the one he closed), through switch 71, to conductor 96. This causes relay 89, which is a locking relay, to close its contacts 89a and 89b. The contacts 89a short circuit switch 90, thereby locking the relay and permitting the push button switch 90 to be released.

When the contacts 89b close, they extend conductor 97, via a wire 197, to the open contacts of switch 70, thereby conditioning switch 70 for operation. The signal lamp 102 which, prior to the operation just described, was receiving current from the conductor 97 via the contacts 89b and the wire 102a, is thereby extinguished due to the fact that the contact between the switch arm and the wire 102a is interrupted when the switch arm contacts the wire 197.

(2) While the foregoing operations mentioned under paragraph (1) hereof are transpiring, cam nose 76 on finger 65 has been moving anti-clockwise, and just as the leading edge of the scanning beam 92 reaches the "0" or left-hand edge of the copy space 82, the cam nose 76 momentarily engages the member 75 of switch 70 and closes said switch.

(3) When switch 70 is closed a circuit is established via conductor 70b, the relay winding 70a, and via conductor 98, and the closed contacts on switch 71 to conductor 96. This energizes relay 70a and it closes its contacts.

Contacts 99 on relay 70a merely short circuit the switch 70. Contacts 100 extend the circuit via conductor 101 to film drive motor clutch 32, the magnet 37 of the camera shutter, and the signal light 103, thereby causing both the drive-motor and the camera shutter to operate. The shutter mechanism is quick acting, and the armature 38c attached to the shutter 38 is moved from the position shown in Figure 6 in dotted lines to the position shown in solid lines. This uncovers slit 36 and allows the image reflected from the copy 83 to impinge on film 30.

As the camera clutch 32 is energized, the film 30 is moved past the lens 34, and this movement of the film is at some fixed speed relative to the movement of the mirror 58, and consequently of the beam 92 that scans the copy 83. The result is that a composite image made up of all portions of the copy scanned is flowed upon the film to form a complete image same as occurs in known flow cameras in which, however, the copy and film are both in motion.

(4) When the beam 92 has scanned the distance 0–15 for which the apparatus was set, the cam nose 78 on finger 66 has reached the position in its revolution where it pushes the member 77 of switch 71 upwardly. This opens the contacts of switch 71 thereby opening the circuit through relay 70a which releases its contacts, releasing relay 89, which opens its contacts restoring the circuits to normal waiting position. Camera clutch 32 is deenergized and the film 30 stops moving. The shutter 38 is released by magnet 37. If switch 90 is again closed, the cycle just described is repeated.

During the time the camera is in operation, the red signal lamp 103 is illuminated, and the operator knows from this not to operate any of the switches.

Should a page-turner be applied to the copy, or should the operator be expert enough to turn copy by hand while the device is on the non-photographing part of its cycle, the switch 91 can be closed, and then cams 76, 78 will operate to control as previously described, but it is no longer necessary to momentarily close switch 90 to initiate each cycle.

A study of the foregoing method of setting the fingers 65, 66 carrying the cams will reveal that it is possible to so set the device that any part of the copy can be photographed—for example, that 10 inch portion between 15 and 25 on the copy support scale—without wasting film on matter scanned by the mirror 58 in its sweep from 0 to 15 ahead of said space or from 25 to 30 after said space has been passed. This is made possible by the adjustable fingers 65, 66, and the fact that the camera is controlled to photograph only while the beam 92 is sweeping over a certain selected sector in its path of travel across the entire copy space.

Referring to Figures 9 and 10, and assuming that the space to be photographed is 10 inches wide and begins at 15 and ends at 25 on the copy support scale 47, the starting or enabling finger 65 is set at "15" to start the camera at this point as previously described. As the space to be photographed is 10 inches wide, finger 66 is set at 25. This will stop the camera after it has photographed 10 inches of the copy, as the camera only operates during that portion of the revolution of the mirror 58 when its beam 92 is scanning the 10 inch space, which space is represented by the angular separation "X" of the cams 76, 78 on the scale 64a on disc 64. At all other times the camera shutter is closed and the film in the camera is not in motion, although the camera motor 31, mirror motor 55 and lamps 35, 36 may be in operation.

Figure 9 shows the timing apparatus as just described at the beginning of a scanning period to scan 10 inches between 15 and 25 on the copy space scale. Figure 10 shows the apparatus at the end of the scanning period. In the modification shown in Figure 11, the arrangement is exactly like that shown in Figure 2, except that the copy support is curved to conform to the field of the lens. This copy support is designated by the numeral 82a, and the copy thereon is designated by the numeral 83a. All of the other numerals are the same as those on Figure 2.

The scanning beam 92 may be masked by the slit or aperture 51a in the casing 51, and if necessary a sleeve 51c may be placed around the casing 51 and moved to change the width of the slit. The beam is further masked at 48 and 36 if desired. Since a narrow band across the center of the lens is employed, superior definition equal to that obtained in so-called "flow type" cameras is obtained thereby permitting cheaper lenses to be employed than are used in still cameras where the film is still and the copy is still.

From the above it will be clearly seen that we have, by this invention, provided a camera wherein the object or copy to be photographed is stationary and wherein the film is moved, and a flowing slit image of the object is impressed upon the moving film thereby providing in such a camera all of the advantages of a flow camera.

One of the objects and advantages of the invention is to provide a mirror unit of the class described comprising the mirror 58 and means for moving it mounted in a casing such as 51 and removable as a unit from the front of the cabinet 10 for cleaning and repair. This unit as shown can be removed from the cabinet by removing the screws holding the front plate 52 in place on the cabinet. The unit can then be pulled forward off support 54 on the rear thereof and operated while out of the cabinet by motor 55 if necessary.

It will be observed the unit carries the motor bearings and the front bearing 59 in permanent alignment, and that the mirror frame structure 57 is free from such strains as might occur if its front end was mounted in the front wall 12 of the cabinet and its rear end on wall 11 thereof.

The words "still copy" used herein mean anything placed in the opening 79 of the device.

By "scanning beam" is meant the beam of light 92 reflected from the copy 83 and caught and reflected by the mirror 58 as the latter moves.

The term "flowing a slit image upon a moving light sensitive element" is intended to mean scanning a fixed object, picking up a progressive slit image of said object as the scanning progresses thereacross, and impressing said image progressively upon the film or other light photosensitive medium which is in motion in the camera and moving in definite timed relation to the scanning.

What is claimed is:

1. In a photographic apparatus, a cabinet including a framework having a front wall with openings therein, a copy support in said cabinet and accessible through one of said openings and adapted to receive and hold copy in a stationary position to be photographed, said support including a substantially horizontal platform upon which the copy to be photographed can be bodily placed thereon and removed therefrom at will through said opening, a camera in said cabinet including a lens and a film and means for moving the film past the lens, a movable scanning unit including an optical beam-deflecting member movable in timed relation to said film mounted in said cabinet and having its axis extending from said front opening in said cabinet toward the rear wall thereof and adapted to cause a beam of light reflected from copy on said support to enter said camera lens and impinge upon said moving film whereby an image of said copy may be imprinted thereon, said unit being removable through another of said openings in the front wall of said cabinet, said last opening being normally closed by the front end of said unit, and means in the optical path between said support and said film for defining on said film the width of the area photographed thereon.

2. In combination, a copy support for fixedly supporting copy to be photographed, a camera having a lens, a shutter for said lens, means for opening and closing said shutter, means for moving film past the back focus of said lens, an optical beam deflecting member in the optical path of said lens and movable therein to deflect light from said copy to said lens, and switch means including a manually adjustable member controlled in timed relation to the movement of said member for varying the duration of the opening of said shutter and the time said film moves.

3. In combination, a cabinet, a camera mounted therein including a lens and means including a motor for moving a film past the back focus of said lens, optical beam deflecting means in said cabinet adapted to deflect light to said lens and including a member extending through a wall of said cabinet and secured to said beam deflecting member, and adjustable means including contacts operated by said last member operated by the movement thereof for controlling the starting and stopping of said motor.

4. In combination, a cabinet, a copy support therein, optical beam deflecting means in said cabinet and positioned above said support and adapted to cause a scanning beam to traverse said support, a camera in said cabinet above said support and having a lens adapted to receive the beam of light from said deflecting means, means including a motor for moving a film past the back focus of said lens, a second motor means for moving said beam deflecting means operated by said second motor, and adjustable means including contacts for controlling the movement of said film in timed relation to the movement of said motor means.

5. In apparatus of the class described, a camera including a lens and motor, means operated by said motor for moving film past the back focus thereof, optical beam deflecting means defining a scanning beam and adapted to direct a beam of light to said lens, and control means for controlling the operation of said motor means to start the motion of said film at any time relative to a first position of said optical beam deflecting means and to stop said film when said means is in a second position, said film moving means being in operation while said optical beam deflecting means is moving from said first to said second position.

6. The combination as claimed in claim 5 wherein a shutter is controlled by said control means and is opened at said first position of said scanning beam and closed at said second position thereof.

7. In a device of the character described, a scanning device adapted to scan an area fixed in respect to the lens of a camera and reflect successive images of portions of said area to said camera, film moving mechanism adapted to move a film in the rear focus of said lens, means for moving said scanning device to cause same to scan said area in timed relation to the movement of said film moving mechanism, means for selecting a particular portion of said area to be scanned, and means for starting said film moving mechanism as said selected portion of said area is reached and scanned by said scanning device and for stopping said mechanism when said scanning device has scanned said selected portion of said area.

8. A method of photographing a predetermined area of a still object which consists of, illuminating the object to be photographed prior to scanning same, scanning said object with a moving elongated reflective member adapted to reflect a flowing image of said object to a lens, moving a film in the rear focus of said lens in timed relation to the movement of said image, exposing said moving film to said flowing image while said reflective member is scanning a predetermined portion of said object, and holding said film stationary while said reflective member is scanning areas of said object outside said predetermined selected portion thereof.

9. In a device of the character described, a framework, a copy support on said framework upon which copy may rest by gravity to be photographed, a camera mounted upon said framework including a lens and means for intermittently moving a film past the back focus of said lens, and moving means for transmitting to said lens successive images of parts of copy resting on said support to form a complete image of said copy on said film, said moving means and said film being moved in timed relation and means controlled by the movement of said last moving means for controlling said film moving means to permit said film to move intermittently during the continuous movement of the means for transmitting images to the lens.

10. The combination as claimed in claim 9, wherein said moving means for transmitting successive images is rotatable and during part of each revolution thereof transmits sequentially a plurality of images of sections of copy resting on said support to form a complete image of said copy on said film.

11. The combination as claimed in claim 9, wherein said moving means for transmitting successive images includes a mirror defining an area of a stationary object lying on said support and to transmit images of sections thereof defined by said mirror to said lens to form a continuous image on said film while same is in motion.

12. In combination, a camera including a lens and a movable film, a support adapted to hold objects to be photographed while same are stationary on said support, a revolvable frame extending above said support and having its axis parallel to the plane of said support, a scanning device supported on said frame adapted to reflect light from objects on said support to said camera, an adjustable slit-forming member secured to said revolvable frame to define the width of the light beam received by said scanning device, and means for moving said film and scanning device in timed relation.

13. The combination as claimed in claim 12, wherein said frame forms a casing for the scanning device, and said casing has apertures therein for the beams of light impinging upon and leaving said scanning device when the latter is in position to reflect light from an object on said support to the lens of the camera.

14. The combination as claimed in claim 12, including a motor supported on said frame and connected to said scanning device to rotate the same.

15. The combination as claimed in claim 12, wherein means associated with said frame and operated by the movement thereof is provided for controlling the movement of film in said camera.

16. The combination as claimed in claim 12, wherein means associated with said frame and operated by the movement thereof is provided to adjust the time in each revolution of said scanning means at which said camera begins to photograph objects reflected thereto by said means.

17. In a device of the character described, a camera including a lens and mechanism for moving film in the back focus of said lens, a support on which objects may rest in a stationary position to be photographed, movable means interposed between said support and said camera for receiving reflected light from objects on said support and directing said light to the lens of said camera so as to form an image on said film, and manually adjustable means operated in timed relation to the movement of said movable means to predetermine the period during which said film is in motion and thereby determine the area photographed.

18. In combination, a framework having a horizontal copy support, an optical beam deflecting member mounted in said framework and adapted to cyclically scan copy on said support, a motor connected to said member to move the same, a camera including means for moving a film, and manually adjustable means operatively connected to said film moving means to predetermine the point in each cyclic movement of said beam deflecting member at which said film moving means begins and ends its movement.

19. The combination as claimed in claim 18 wherein said first motor is a synchronous motor and said film moving means includes a second synchronous motor.

20. In combination, a copy support for fixedly supporting copy to be photographed and on which said copy is held by gravity, a camera having a lens, means for moving film past the back focus of said lens, an optical beam deflecting member in the optical path of said lens and movable therein to reflect light from said copy to said lens, and means controlled in timed relation to the movement of said member for varying the duration of movement of said film independently of the movement of said beam deflecting member.

21. In combination, a cabinet having a compartment therein, a camera in said compartment having a lens and means including a motor for moving film past the back focus of said lens, optical beam deflecting means in said cabinet adapted to deflect light to said lens, a copy support within said cabinet subjacent said beam deflecting means operated by said beam deflecting means, and adjustable means for controlling the starting and stopping of the movement of said motor in timed relation to the movement of said beam deflecting means.

VERNEUR E. PRATT.
GEORGE F. GRAY.

REFERENCES CITED

The following references are of record in the file of this patent:

UNITED STATES PATENTS

| Number | Name | Date |
|---|---|---|
| 511,133 | Fretwell | Dec. 19, 1893 |
| 994,935 | Kleinschmidt | June 13, 1911 |
| 1,987,064 | Hopkins | Jan. 8, 1935 |
| 2,177,135 | Fassel | Oct. 24, 1939 |
| 2,292,825 | Dilks | Aug. 11, 1942 |
| 2,349,931 | Back | May 30, 1944 |

FOREIGN PATENTS

| Number | Country | Date |
|---|---|---|
| 16,175 | Sweden | Aug. 8, 1903 |
| 287,488 | Germany | Sept. 25, 1915 |